Figure 1:
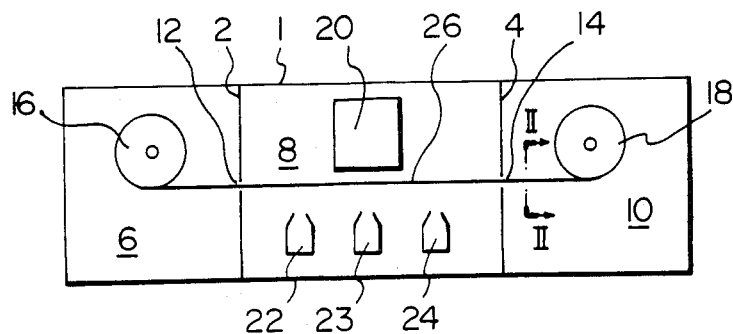

United States Patent [19]

Dobrowolski et al.

[11] Patent Number: 4,626,445
[45] Date of Patent: Dec. 2, 1986

[54] METHOD OF MANUFACTURING AN OPTICAL INTERFERENCE AUTHENTICATING DEVICE

[75] Inventors: Jerzy A. Dobrowolski, Ottawa; Allan J. Waldorf, Kemptville, both of Canada

[73] Assignee: Canadian Patents and Development Limited, Ottawa, Canada

[21] Appl. No.: 797,167

[22] Filed: Nov. 12, 1985

[30] Foreign Application Priority Data

Nov. 9, 1984 [CA] Canada .................................. 467550

[51] Int. Cl.$^4$ .............................................. B41M 3/14
[52] U.S. Cl. .......................................... 427/7; 283/91; 283/94; 427/53.1; 428/333
[58] Field of Search ...................... 427/7, 53.1; 283/72, 283/91, 94, 87; 428/333

[56] References Cited

U.S. PATENT DOCUMENTS

| | | | |
|---|---|---|---|
| 2,100,840 | 11/1937 | Elmore | 427/7 |
| 3,897,964 | 8/1975 | Oka et al. | 283/91 |
| 3,919,447 | 11/1975 | Kilmer | 283/91 |
| 4,304,809 | 12/1981 | Moraw et al. | 283/87 |
| 4,519,632 | 5/1985 | Parkinson et al. | 283/72 |

FOREIGN PATENT DOCUMENTS 2093404 9/1982 United Kingdom ................. 283/72

*Primary Examiner*—John H. Newsome

[57] ABSTRACT

Hard to simulate, readily distinguishable from counterfeits, optical interference authenticating devices are provided by depositing two coatings on a substrate, each coating comprising at least one optical interference layer, the material of each layer being selected so that the two coatings together and separately have different spectral reflectance and spectral transmittance characteristics at different angles of incidence of light thereon. The substrate may be, for example, a polyester film and a first one of the coatings is sufficiently radiation absorbing of, say, infrared radiation that at least one portion of that coating can be removed by an infrared laser beam through, for example, a mask to provide a readily distinguishable pattern on the substrate. The first coating may be, for example, a multilayer absorber coating containing Inconel, aluminum or some other suitable material, while the other coating, which is insufficiently radiation absorbing by, for example, infrared radiation to be substantially resistant to excavation solely by the infrared laser beam may be, for example, a multilayer coating of $ZrO_2$ or $SiO_2$, etc. If the first coating is outermost from the substrate then only the first coating will be excavated by the infrared laser beam. If the second coating is outermost from the substrate then both the first and second coatings will be excavated by the infrared laser beam.

11 Claims, 18 Drawing Figures

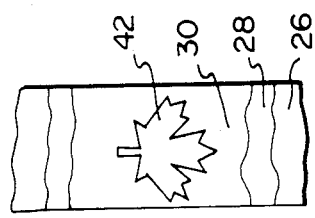
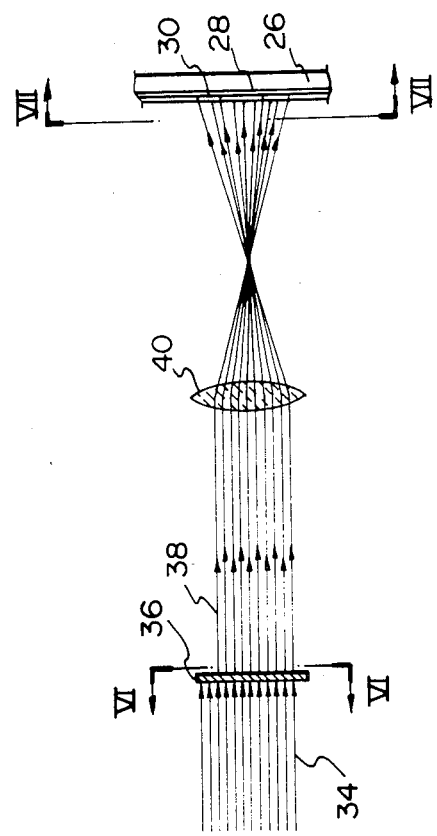
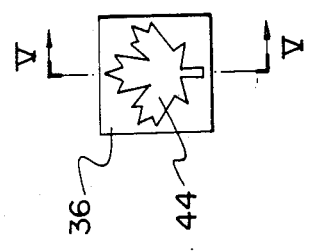
FIG. 7
FIG. 5
FIG. 6

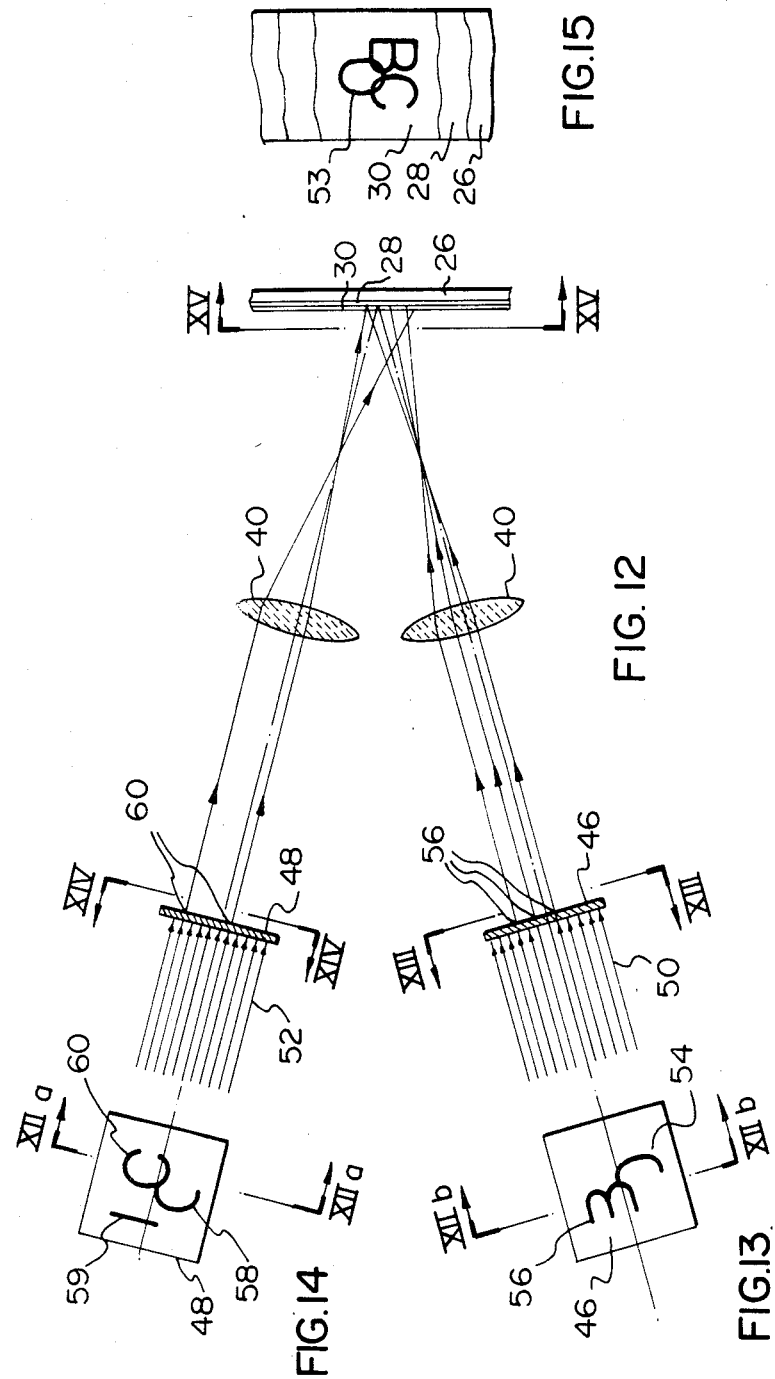

METHOD OF MANUFACTURING AN OPTICAL INTERFERENCE AUTHENTICATING DEVICE

This invention relates to a method of manufacturng an optical interference authenticating device.

One optical interference authenticating means described in U.S. Pat. No. 3,858,977, dated Jan. 7, 1975, Baird et al, makes use of the fact that the reflected colour from a white light that one would actually perceive when such a filter is attached to an opaque substrate depends strongly on the angle of viewing and on the colour of the surface of the substrate. For example, a free standing nine layer filter composed of alternate optical interference layers of zinc sulphide and magnesium fluoride may have a high reflectance in the red part of the spectrum, and when viewed at increasing angles of incidence the wavelength of the main reflectance peak shifts from the red through the yellow and green towards the blue part of the spectrum. But the colour that one would actually perceive when such a coating is attached to an opaque surface will depend strongly on the spectral absorption characteristics and thus colour of that surface. Since at normal incidence the filter will strongly reflect red light, light of shorter wavelengths will be transmitted by the filter and will fall on to the opaque surface. Some of the light falling on the opaque surface is reflected back by this surface and transmitted out again by the filter, and if this is substantially all of the light transmitted by the filter, then the reflected light from the surface will recombine with the reflected light from the filter to produce, what is observable by the eye as, white light once more. In practice, the composition of the perceived light will, in general, not be completely white. The reason for this is that there may be some residual absorption within the interference layers, and that the reflectance of even a white surface is not 100% and that this reflectance is not normally specular, but is diffuse.

If a suitable combination of optical interference coatings and surface colour and pattern of the substrate are chosen, it is possible to obtain interesting colour effects. A maximum colour contrast is obtained where the surface of the substrate is coloured black. On the other hand, very little colour is observed where the substrate is coloured white because the white colour substantially does not absorb. Thus, a black silhouette on a white background on the substrate will only show the silhouette brightly revealed in the saturated hue reflected by the filter. Furthermore, the hue will change when the viewing angle is changed.

As this effect cannot be duplicated by any paint, pigment or colour copying procedure it enables the main in the street to distinguish at a glance an authentic valuable paper bearing such optical interference layers from even the best counterfeit lacking this authenticating device.

U.S. Pat. No. 4,186,943, dated Feb. 5, 1980, P. D. Lee makes use of the optical interference authenticating coatings taught by Baird et al by incorporating them as a narrow strip of thin film running through the material of a sheet, in a manner similar to that of the well known and currently used security thread in a British banknote. The transmissivity of the sheet varies about the thin film so that at least one point where the transmissivity is relatively great the sheet constitutes a pair of superposed windows between which the thin film extends so as to be visible through each window to permit observance of the spectral reflectance and spectral transmittance characteristics.

While widespread interest has been shown in the optical interference authenticating coatings taught by Baird et al it would clearly be desirable to improve their security effectiveness by enabling the main in the street to better distinguish at a glance, for example, an authenic, valuable paper bearing such optical interference coatings from even the best counterfeit bearing an imitation of this authenticating device.

It would also be desirable to improve the security effectiveness of the optical interference coatings taught by Baird et al by making them even harder to simulate.

According to the present invention there is provided a method of manufacturing an optical interference authenticating device comprising;

(a) depositing two coatings on a substrate, each of the said coatings comprising at least one optical interference layer, the materials of the layers being selected so that the two coatings together and separately have different, known spectral reflectance and spectral transmittance characteristics, at different angles of incidence of light thereon, (i) a first one of the said coatings being sufficiently radiation-absorbing for electromagnetic radiation of a particular wavelength to be excavatable by a beam thereof of sufficient intensity and duration, (ii) a second one of the said coatings being insufficiently radiation-absorbing for the said electromagnetic radiation of a particular wavelength to be substantially resistant to excavation solely by absorbing radiation of a beam thereof of sufficient intensity and duration to excavate the said first one of the coatings, and (b) excavating, by a beam of the said electromagnetic radiation, at least one identifiable configuration in the said first coating, to form at least one excavated area on the substrate having at least one of said characteristics sufficiently different from that of the remainder thereof to be distinguishable therefrom at a particular angle of incidence of light on the substrate.

In some embodiments of the present invention the second coating is deposited on the substrate before the first coating is deposited thereon, so that the second coating remains substantially intact when the said at least one portion of the first coating is excavated by the beam of electromagnetic radiation.

In other embodiments of the present invention the first coating is deposited on the substrate before the second coating is deposited thereon, so that portions of both the first and second coatings are excavated by the beam of electromagnetic radiation.

In yet other embodiments of the present invention the first coating is substantially transparent for a known spectral region.

The second coating may be substantially transparent for a known spectral region.

When the optical interference authenticating device is for attachment to a substantially non-transparent article, the substrate is preferably of a material that is substantially transparent for the spectral regions of the known characteristics of the first and second coatings so that the substrate may form a protective, outer covering for the first and second coatings when the optical interference authenticating device is attached to the non-transparent article.

In some embodiments of the present invention at least one further coating comprising at least one further layer having different, known spectral reflectance characteristics and spectral transmittance characteristics to the remainder is deposited on the substrate.

The electromagnetic energy may be infrared laser radiation.

When the electromagnetic energy is infrared laser radiation it preferably has a wavelength at least of the order of 5.0 μm when it is directed through the substrate, in the form of a polyester film having a thickness no greater than of the order of 0.25 mils, to excavate the said at least one portion of the first coating. In this case the sum of the optical thicknesses of the two coatings, including any other coatings having known spectral reflectance and transmittance characteristics that may be deposited on the substrate, preferably does not exceed 2.2 μm, and better still does not exceed 0.4 μm.

Applicants have found that patterns produced in optical interference authenticating devices by electromagnetic radiation and in accordance with the present invention may not be subject to the restrictions normally associated with patterns produced by, for example, vapour deposition through stencils or masks and even very delicate patterns, which cannot be produced in any other manner known to the applicants, can be produced in a much easier manner than relatively cruder patterns can be produced by, for example, vapour deposition through masks or stencils.

Figure 2:
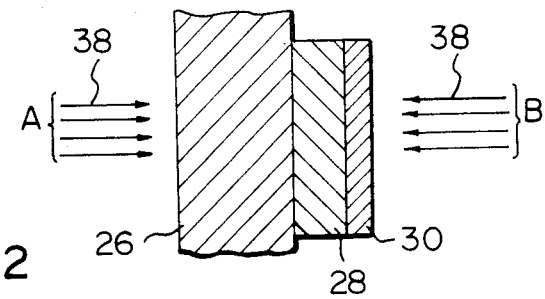
Figure 3:
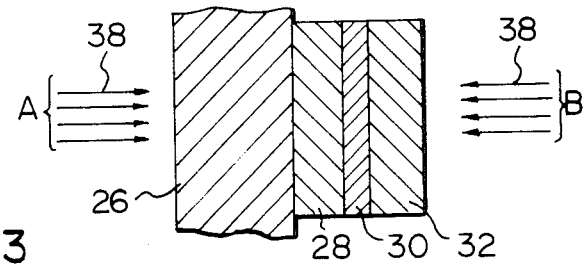
Figure 4:
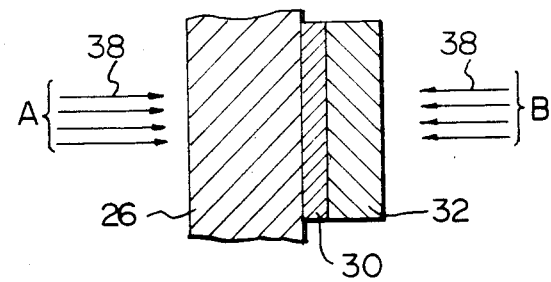
Figure 16:
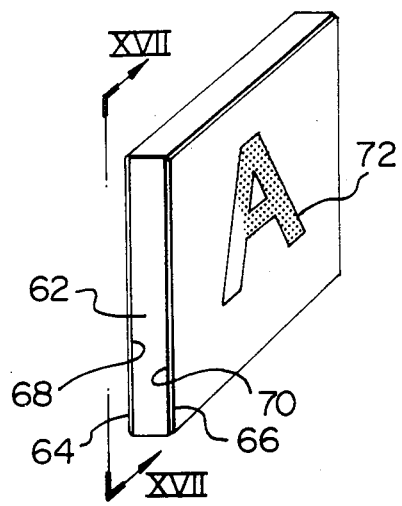
Figures 17, 18:
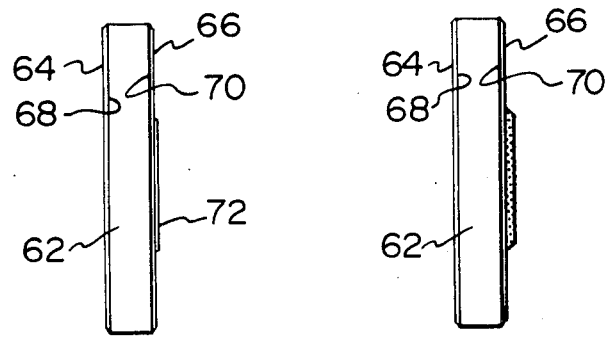

In the accompanying drawings which illustrate, by way of example, embodiments of the present invention;

FIG. 1 is a diagrammatic side view of a vacuum coating apparatus for depositing optical multilayer coatings on one side of a substrate, FIGS. 2 to 4 are enlarged, sectional end views along II—II, FIG. 1, FIG. 5 is a diagrammatic side view of an apparatus being used to manufacture a strip of optical interference devices, and wherein a mask therein is sectioned along V—V, FIG. 6, FIG. 6 is a view along VI—VI FIG. 5 of mask, FIG. 7 is a view along VII—VII, FIG. 5 of a portion of the laser etched strip, FIGS. 8 to 11 are graphs showing the spectral transmittances in the infrared of polyester films of different thicknesses, FIG. 12 is a diagrammatic side viw of an apparatus being used to manufacture having two masks and being used to manufacture a strip of optical interference devices, and wherein the two masks therein are sectioned along XIIa—XIIa, FIG. 12 and XIIb—XIIb, FIG. 13, FIG. 13 is a view along XII—XIII, FIG. 12, of one of the masks, FIG. 14 is a view along XIII—XIII, FIG. 12, of the other mask, FIG. 15 is a view along XV—XV, FIG. 12 of a portion of the laser etched strip, FIG. 16 shows a corner view of a zinc selenide plate mask having a vapour deposited mask pattern thereon, FIG. 17 is an end view along XVII—XVII, FIG. 16, and FIG. 18 is an end view of similar zinc selenide plate mask to that shown in FIG. 16 but having a shim mask pattern mounted thereon.

In FIG. 1 there is shown a known type of vacuum deposition apparatus comprising a casing 1 having two partitions 2 and 4 dividing the casing into a substrate supply compartment 6, a vacuum deposition compartment 8 and a substrate receiving compartment 10. The partition 2 has a substrate inlet slot 12 to the vacuum deposition compartment 8 and the partition 4 has a substrate outlet slot 14 from the vacuum deposition compartment 8.

The substrate supply compartment 6 has a supply reel 16 of substrate and the substrate receiving compartment 10 has a substrate take-up reel 18. The vacuum deposition compartment 8 has a vacuum port 20 and three evaporation sources 22 to 24.

In operation, a web of a substrate 26 of, for example, polyester film fed through the vacuum deposition compartment 8 from the supply reel 16 and is taken up on take-up reel 18. A vacuum of about $10^{-4}$ to $10^{-7}$ torr is applied to the compartment 8 through the vacuum port 20 while the evaporation sources 22 to 24 form vapour clouds of materials, which either do not absorb electromagnetic radiation in the visible part of the spectrum, such as cryolite, NaF, LiF, $MgF_2$, $SiO_2$, $ThF_4$, $LaF_3$, $CeF_3$, $GeO_2$, $ThO_2$, $Al_2O_3$, $PbF_2$, $CeO_2$, $Sb_2O_3$, $HfO_2$, $Bi_2O_3$, $La_2O_3$, $Sc_2O_3$, $Nd_2O_3$, $Ta_2O_5$, SiN, $ZrO_2$, ZnS, $TiO_2$, or which do absorb electromagnetic radiation in the visible part of the spectrum, such as Ag, Al, Au, Cu, Cr, Ge, Ni, NiCr, Si, Rh. The vapour clouds deposit thin layers on the underside of the substrate 26. The sequence of the materials and their rates of evaporation on the substrate 26 are chosen to result in an optical multilayer coating, on the underside of the substrate 26, having the desired spectral reflectane and spectral transmittance.

Referring now to FIGS. 1 and 2, in experiments to verify the present invention, the polyester film substrate 26 was fed from the supply reel 16 through the vacuum deposition compartment 8 to the take-up real 18 as many times as was necessary to deposit the required optical multilayer coating. Thus, for the coating of FIG. 2, a component layer coating 28 was deposited composed of $ZrO_2$ and $SiO_2$ layers so that the coating 28 is essentially non-absorbing in the visible part of the spectrum. Then a component layer system 30 was deposited, usually composed of a few $SiO_2$ and Inconel layers, that had a substantial absorption at the intended laser wavelength, and was therefore vapourizable. In addition, the thicknesses of the individual layers making up the two component layer systems 28, 30 were so chosen that the total (or combined) optical multilayer coating had the required spectral transmittance and reflectance characteristics.

Referring now to FIGS. 1 to 3, for other experiments to verify the present invention the coated polyester film substrate 26 was passed through the vacuum deposition compartment 8 again and vacuum coated with $ZrO_2$ and $SiO_2$ vapour to provide an additional, third, essentially electromagnetic radiation non-absorbing, component layer coating 32.

Referring now to FIG. 4, there is shown yet another embodiment of the present invention wherein the absorbing component layer coating 30 is first applied to the substrate 26, and then the essentially non-absorbing component layer coating 32 is applied thereon. In other words, no coating 28 (FIG. 3) is provided.

Referring now to FIGS. 5 to 7, where similar parts to those shown in FIG. 2 are designated by the same reference numerals and the previous description is relied upon to describe them, there is shown the coated substrate of FIG. 2 being laser etched to provide an excavated strip of optical interference devices.

In FIGS. 5 to 7 high power density, parallel laser beam radiation 34 from a source (not shown) is directed towards a mask 36 and the unmasked portion 38 of the laser beam radiation 34 is imaged by a converging lens 40, after passing through the mask 36, on to the coatings 28 and 30 on the substrate 26.

The unmasked portion 38 of the laser beam radiation 34 excavates the portion of the absorbing component layer coating 30 to expose the same configuration 42 (FIG. 7) of the reflecting coating 28 as the laser beam radiation transmitting opening 44 (FIG. 6) in the mask 36. The substrate 26 is fed passed the laser beam radiation 34 by a step motor (not shown) so that a series of configurations 42 are excavated along the substrate 26 which may be eventually cut to provide individual optical interference authenticating devices.

Thus the laser radiation etching method according to the present invention is based on the fact that when a high power density laser beam radiation incident from direction B (FIG. 2) falls on to a coating having a high absorption coefficient coating at the wavelength of the laser beam radiation, such as the absorbing component layer coating 30, the portion 38 of the coating receiving the laser beam radiation, together with any coatings 32 (FIG. 3) is or are excavated if the power density of the portion 38 of the laser beam radiation 34 is of sufficient magnitude for this purpose.

If the absorption coefficients of materials of substrate 26 (FIG. 2) and the coating 28 are very small or zero at the wavelength of a high power density laser beam radiation incident from direction A then the laser beam will excavate the absorbing component layer coating 30 and any coatings 32 (FIG. 3). The same situation applies to the coatings 30 and 32 (FIG. 4).

If the absorption coefficients of the materials of the substrate 26, and the coatings 28 (FIG. 2) and 32 (FIG. 3) are intermediate in magnitude at the wavelength of the laser beam, then the laser beam radiation 38 may be gradually absorbed within these coatings without excavating them. Furthermore, the resulting attenuation of the laser beam radiation 38 may be of such a magnitude, that the power density of the laser beam radiation reaching the absorbing component layer coating 30 may be insufficient to excavate the portion thereof that the laser beam radiation impinges upon.

The laser beam radiation 38 may also be seriously attenuated even when the magnitudes of the absorption coefficients of the materials of the component layer coatings 28 and 32 and the substrate 26 are small or zero at the wavelength of the laser beam radiation, if the reflectances of these materials, or indeed of the absorbing component layer coating 30 are great at the wavelength of the laser beam radiation.

It should be noted that, in general, the reflectance characteristics of the absorbing component layer coating 30 (FIGS. 2 to 4) will be different for laser beam radiation incident from direction A to that from direction B.

In the experiments to verify the present invention using the apparatus shown in FIGS. 5 to 7, the laser radiation source was a laser apparatus marketed under the trademark Laser Mark Model 920L by Lumonics Inc., Ottawa, Canada, and having:
a pulsed $CO_2$ TEA laser beam, $\lambda = 10.6$ $\mu m$,
an output of 2.5 to 5.0 Joules/pulse,
a beam size of approximately 2 cm $\times$ 2 cm,
an energy density $\approx 0.6$ to 1.2 Joules/cm$^2$,
a pulse duration $\approx \mu sec.$,
a repetition rate of 14 Hz.,
a germanium, flat front mirror with 70% T,
a 14 m radius, gold coated, germanium rear mirror.

The optical system comprised:
two spherical, germanium lenses (+/2 and +/6 respectively)
forming part of the laser apparatus, and for directing a parallel radiation, laser beam to, one cylindrical, converging, germanium lens (+/6) constituting the converging lens 40.

The gas use comprised (by volume)
Initial experiments:
6% $CO_2$
6% $N_2$
88% He
and in subsequent experiments, to obtain a greater power density output:
8% $CO_2$
8% $N_2$
84% He.

In the experiments the energy density of the laser beam radiation incident on the coated or the uncoated side of a ¼ mil polyester film forming the substrate 26 was varied by moving the converging lens 40 closer to or away from the substrate 26, thus changing the magnification of the laser beam radiation incident on the coated side of the substrate 26.

The mask 36 was of brass shim stock, and the laser beam radiation transmitting opening 44 in the mask 36, was cut therefrom by means of a pantograph cutter.

The following Table I gives the construction parameters of five multilayer coatings used in the subsequent text. In each instance, the polyester used was Mylar. In all the experiments the second medium was air. Layer 1 is always closest to the substrate, even when the coating is deposited over another coating.

TABLE I

| | CONSTRUCTION PARAMETERS OF COATINGS USED IN SUBSEQUENT TEXT | | | | | | | | |
|---|---|---|---|---|---|---|---|---|---|
| LAYER | RED | | IR (INFRARED) | | GREEN | | BLUE | | BLACK ABSORBER | |
| NUMBER | nt | material | nt | material | nt | material | nt | material | nt | material |
| | POLYESTER ON THIS SIDE | | | | | | | | | |
| 1 | .2206 | $ZrO_2$ | .2466 | $ZrO_2$ | .2963 | $SiO_2$ | .2999 | $SiO_2$ | .0034 | NiCrFe |
| 2 | .4353 | $SiO_2$ | .4803 | $SiO_2$ | .2323 | $ZrO_2$ | .1877 | $ZrO_2$ | .1125 | $SiO_2$ |
| 3 | .2122 | $ZrO_2$ | .2342 | $ZrO_2$ | .3307 | $SiO_2$ | .2872 | $SiO_2$ | .0109 | NiCrFe |
| 4 | .4202 | $SiO_2$ | .4648 | $SiO_2$ | .1996 | $ZrO_2$ | .1681 | $ZrO_2$ | .3117 | $SiO_2$ |
| 5 | .2074 | $ZrO_2$ | .2280 | $ZrO_2$ | .3635 | $SiO_2$ | .3248 | $SiO_2$ | .0600 | NiCrFe |
| 6 | .4172 | $SiO_2$ | .4625 | $SiO_2$ | .1429 | $ZrO_2$ | .1276 | $ZrO_2$ | | |
| 7 | .2063 | $ZrO_2$ | .2278 | $ZrO_2$ | .3963 | $SiO_2$ | .3499 | $SiO_2$ | | |
| 8 | .4169 | $SiO_2$ | .4619 | $SiO_2$ | .1332 | $ZrO_2$ | .1201 | $ZrO_2$ | | |
| 9 | .2071 | $ZrO_2$ | .2281 | $ZrO_2$ | .4296 | $SiO_2$ | .3652 | $SiO_2$ | | |
| 10 | .4192 | $SiO_2$ | .4636 | $SiO_2$ | .1077 | $ZrO_2$ | .0922 | $ZrO_2$ | | |
| 11 | .2109 | $ZrO_2$ | .2319 | $ZrO_2$ | .4624 | $SiO_2$ | .4171 | $SiO_2$ | | |
| 12 | .4302 | $SiO_2$ | .4751 | $SiO_2$ | .0675 | $ZrO_2$ | .0287 | $ZrO_2$ | | |
| 13 | .2206 | $ZrO_2$ | .2453 | $ZrO_2$ | .4953 | $SiO_2$ | .3805 | $SiO_2$ | | |

TABLE I-continued

| | CONSTRUCTION PARAMETERS OF COATINGS USED IN SUBSEQUENT TEXT | | | | | | | | |
|---|---|---|---|---|---|---|---|---|---|
| LAYER | RED | | IR (INFRARED) | | GREEN | | BLUE | | BLACK ABSORBER |
| NUMBER | nt | material | nt | material | nt | material | nt | material | nt | material |
| 14 | | | | | .0346 | $ZrO_2$ | .0771 | $ZrO_2$ | | |
| AIR ON THIS SIDE | | | | | | | | | | |

NB: t, nt are metric, optical thicknesses in micrometers.

The following Table II shows the behaviour of four different coated polyester film substrates when exposed to laser beam radiations of different power density outputs incident on either side in directions A or B (FIGS. 2 to 4) of the coated substrate 26. In some instances all of the coatings 28, 30 and 32 (FIGS. 2 to 4) were removed, while in others only the coatings 30 and 32 (FIGS. 3 and 4) were removed.

TABLE II

| | | $CO_2$ LASER EXPERIMENTS WITH DIFFERENT LASER POWER DENSITIES | | | |
|---|---|---|---|---|---|
| LASER BEAM REDUCTION BY THE POSITION OF THE CONVERGING LENS 40 | RELATIVE LASER POWER DENSITY AVAILABLE FOR VAPOURIZING | COATINGS ON POLYESTER SUBSTRATE AND MEDIA THROUGH WHICH LASER PASSES TO COATINGS | | | |
| | | BLACK ABSORBER | | IR + ABSORBER + BLUE | |
| | | AIR | SUBSTRATE | AIR | SUBSTRATE |
| 1 | 1.00 | | Partial removal, especially at edges | No effect | |
| 1.25 | 1.56 | Partial removal | Substantial removal | No effect | No effect |
| 1.5 | 2.25 | Very substantial removal | Complete removal | Partial damage to IR, but not other | Very slight damage at edges |
| 1.75 | 3.06 | | | Substantial removal of both | Almost complete removal of Blue-to-Black, no effect on IR coating |
| 2.00 | 4.00 | | | Complete removal | Complete removal of Blue-to-Black, no damage to IR coating |
| 2.25 | 5.06 | | | | |

| LASER BEAM REDUCTION BY THE POSITION OF THE CONVERGING LENS 40 | RELATIVE LASER POWER DENSITY AVAILABLE FOR VAPOURIZING | COATINGS ON POLYESTER SUBSTRATE AND MEDIA THROUGH WHICH LASER PASSES TO COATINGS | | | |
|---|---|---|---|---|---|
| | | RED + ABSORBER + IR | | RED MULTILAYER REFLECTOR | |
| | | AIR | SUBSTRATE | AIR | SUBSTRATE |
| 1 | 1.00 | | No effect | No effect | No effect |
| 1.25 | 1.56 | No effect | Slight mark at edge - not visible from other edge | No effect | No effect |
| 1.5 | 2.25 | No effect | Substantial removal | No effect | No effect |
| 1.75 | 3.06 | Some removal of red coating | Almost complete removal | | |
| 2.00 | 4.00 | Partial removal of both coatings | Complete removal of both coatings | Partial removal | Partial removal |
| 2.25 | 5.06 | | | Substantial removal | Substantial removal |

In the earliest experiments the available power density outputs of the laser beam radiation incident to either side of the substrate 26 were too low for aluminum coatings to be excavated. It is known that the spectral reflectance of aluminum at 10.6 μm is of the order of 981.

Figure 8:
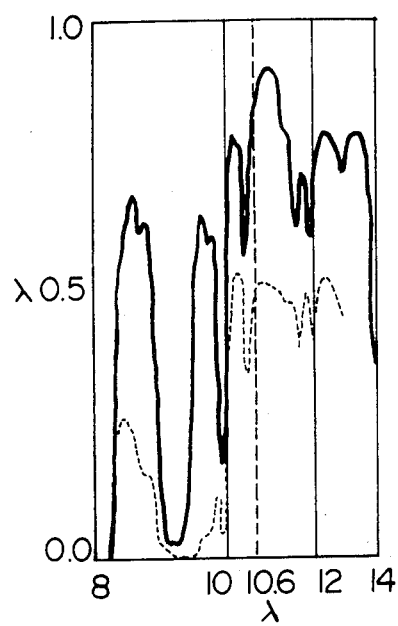
Figure 9:
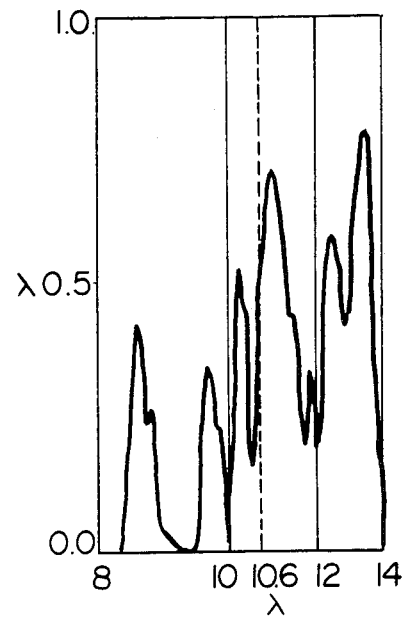
Figure 10:
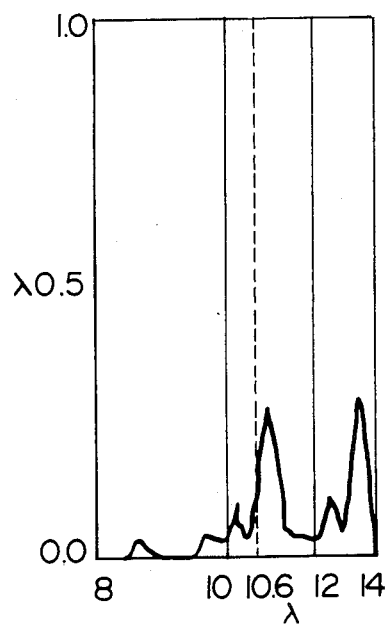
Figure 11:
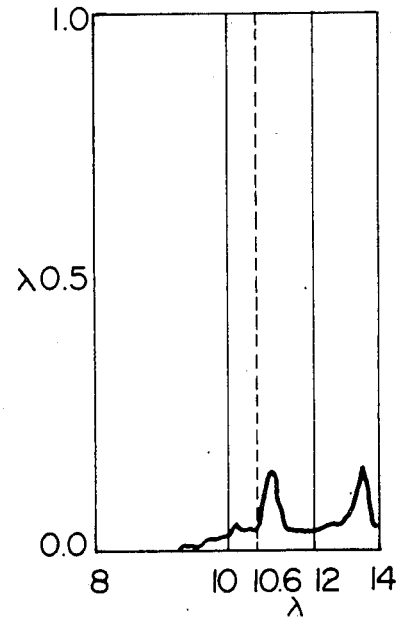

Referring now to FIGS. 8 to 11 the spectral transmittances (T) in the infrared of 0.25, 1,0, 4.0 and 7.0 mil thick, polyester substrate films are plotted against the wavelength (λ) in μm. Also shown in FIG. 8 is the normal incidence transmittance in the infrared of a seventeen layer blue to red reflecting coating. It will be seen that at the wavelength (λ) of 10.6 μm the transmittances T of the polyester films of thickness 0.25, 1.0, 4.0 and 7.0 mil are 85, 53, 15 and 8 percent, respectively. From this it will be seen that the excavatable coating can best be excavated in the direction A (FIGS. 2 to 4) through polyester film substrates having a thickness no greater than of the order of 0.25 mil, and that laser beam radiation having a frequency tuned to a wavelength least of the order of 10.8 μm is most efficient.

It was shown by the experiments that the absorption at 10.6 μm within $SiO_2$ and/or $ZrO_2$ layers making up the coatings 28 and 32 (FIGS. 2 to 4) significantly attenuates 10.6 μm wavelength laser beam radiation. For example, the transmittance of a 17 layer blue/red reflector on 0.25 mil polyester film was only 51% at that wavelength (FIG. 8). It was found that to remove 1×2 cm areas readily, the sum of the optical thicknesses of the coatings 28 and 32, including any other coatings having known spectral transmittance and spectral reflectance characteristics that may be applied to the substrate, should preferably not exceed 2.2 μm, and that thickness of any coating should preferably not exceed 0.4 μm.

To construct an accurate model of the laser beam radiation excavation mechanism not only the optical constants of the materials of the substrate and the coatings for the laser beam radiation wavelength must be known, but also a number of thermal constants of these materials must also be known. Calculations based on the published values have been made to determine the transmittance, reflectance and absorptance characteristics of six different optical interference authenticating devices, with and without the multilayer absorber coating, for a 10.6 μm wavelength laser beam radiation and are tabulated in the following Table III.

the materials used in the experiments were porous and so the known bulk values were considered of limited use. Methods for the investigation of these parameters have already been developed by scientists investigating laser radiation damage to coatings. Another thing that has to be considered is the effect of adsorbed water vapour on the laser beam radiation process.

The design of optical interference authenticating devices having multilayer coatings is a very complex process. To be acceptable, these devices must have an adequate visual appearance, withstand severe mechanical and chemical abuse, and consist of a reasonably small number of layers that can be deposited at high rates to keep the cost down. If logos are to be produced by the laser beam radiation method, it is additionally necessary to optimize the optical properties of the multilayers at the laser beam radiation wavelength. The experiments have shown that $ZrO_2$ and $SiO_2$ as coating materials pair adequately and satisfy all of the above requirements.

It was found from the experiments that a coating of $Al_2O_3$ is transparent in the visible wavelength, yet absorbs radiation strongly at 10.6 μm wavelength. It was also found that a film of this material of 0.55 μm optical thickness, when deposited onto a polyester film substrate prior to the deposition of a reflector stack, could successfully be excavated with laser beam radiation from either direction A or B (FIG. 2). However, the power density required was greater than that needed to vapourize a black absorber coating. From this it was deduced that a thinner layer that is an integral part of the reflecting stack would be better.

The design of a black reflector coating based on a metal with a lower reflectance at 10.6 μm wavelength was considered because this facilitates excavation from the air side. Similar coatings were made for the visible part of the spectrum for a different application. In other embodiments of the present invention a coating is provided that looks black from the Mylar side and has a low reflectance at 10.6 μm wavelength from the exposed side. Experiments with a double-black coating indicated that this is feasible, but it should be borne in mind that this would require the deposition of special layers just for this purpose.

Other experiments have shown that it is possible to produce logos, by the laser beam radiation method, on polyester film treated with a release coating.

Excimer laser beam radiations of 0.308 μm and 0.248 μm wavelengths have also been considered. The efficiency of excavation of the absorbing component layer coating will depend on the magnitude of the absorption coefficients and these may not always be great enough for dielectric materials. Furthermore, complications

TABLE III

| | CALCULATED PERFORMANCE OF BASIC COATINGS AT WAVELENGTHS (λ) OF 10.6 μm AND IN THE NEAR I.R. | | | | | | | | |
|---|---|---|---|---|---|---|---|---|---|
| | REFLECTOR + ABSORBER λ = 10.6 μm | | | REFLECTOR ONLY λ = 10.6 μm | | | REFLECTOR + ABSORBER λ = 1.06 μm | | | REFLECTION PEAK AT λ |
| COATINGS | T | R | A | T | R | A | T | R | A | (in μm) |
| I.R. reflector | .04 | .72 | .23 | .86 | .05 | .00 | .14 | .26 | .60 | 1.36 |
| Red | .02 | .53 | .45 | .80 | .14 | .06 | .13 | .34 | .53 | 1.20 |
| Red + Absorber | .05 | .72 | .24 | .85 | .05 | .10 | .16 | .20 | .64 | 1.22 |
| Green | .04 | .72 | .24 | .86 | .05 | .09 | .07 | .56 | .37 | 1.00 1.16 |
| Blue | .03 | .71 | .26 | .84 | .09 | .07 | .04 | .58 | .38 | 1.00 |
| Blue + I.R. | .02 | .53 | .45 | .74 | .22 | .05 | .18 | .42 | .40 | 1.12 |

Because of uncertainty in the radiation absorption coefficients of the coatings the results given in Table III may not be absolutely accurate. However, these results do indicate that the radiation attenuation due to reflection is quite high, and that the radiation absorption within an opaque layer of the absorbing component layer coating is quite small. There is a significant variation of these quantities for different combination of coatings.

The thermal constants, such as the heat of vapourization and thermal conductance, are well known for the materials used in the experiments. However, some of may arise whenever the laser beam wavelength is shorter than the design wavelength of the optical interference authenticating device, higher order reflectance peaks of the device may attenuate the laser beam radiation.

It would seem natural to utilize a laser wavelength in the region of high efficiency (98% or more) of the absorbing coating. Unfortunately we had no access to high power lasers acting in the visible part of the spectrum. Experiments with a laser peaked at 1.06 μm, where the absorption of some optical interference authenticating devices is still quite high (see Table III), gave poor results.

In FIGS. 12 to 15, similar parts to those shown in FIGS. 5 to 7 are designated by the same reference numerals and the previous description is relied upon to describe them.

The apparatus shown in FIGS. 12 to 15 can laser etch more complicated patterns in the absorbing component layer coating 30 than the apparatus shown in FIGS. 5 to 7 because two masks 46 and 48 are provided. In this embodiment two parallel laser beams 50 and 52 are directed simultaneously at the masks 46 and 48, respectively, vapourize and remove portions of the absorbing component layer coating 30 and excavate configuration 53 therein corresponding to the laser beam radiation transmitting openings 54 and 56 in mask 46 plus the laser beam radiation transmitting openings 58 to 60 in mask 48. As with the embodiment shown in FIGS. 5 to 7, the substrate 26 is fed passed the laser beam radiations 50 and 52 by a stepping motor (not shown) so that a series of configurations 53 are removed along the substrate 26 which may be eventually cut to provide individual optical interference devices.

Referring now to FIGS. 16 and 17 there is shown a different type of mask which may be used in, for example, the apparatus shown in FIGS. 5 to 7, comprising a zinc selenide plate 62 with antireflection coatings 64 and 66 covering the whole of sides 68 and 70, respectively, the plate 62 through which the laser beam radiation is to pass, carrying a mask pattern 72 of, for example, gold or aluminum film which will mask the absorbing component layer coating 30 (FIGS. 5 and 7) from the laser beam radiation 34. Thus with this mask the background is excavated, that is, only the portion of the absorbing component layer coating 30 corresponding to the mask pattern 72 is not excavated.

In FIG. 18, similar parts to those shown in FIGS. 16 and 17 are designated by the same reference numerals and the previous description is relied upon to describe them.

In FIG. 18, a mask pattern 74 is provided cut from gold or aluminum shim and bonded to the antireflection coating 66 by means of a suitable cement.

It is within the scope of the present invention to use, for example, electron beam radiation, visible laser beam radiation or ultraviolet laser beam radiation to excavate the absorbing component layer coating.

The present invention may be used to produce an optical interference authenticating device having at least one non-rectilinear portion such as, for example, the thread having optical characteristics described in U.S. Pat. No. 4,370,057, dated Jan. 25, 1983.

While the embodiments described use vacuum deposition to deposit the coatings on the substrate, it is within the scope of the present invention for the coatings to be deposited on the substrate by other known processes such as, for example, sputtering, deposition from chemical solution, chemical vapour deposition, etc.

The excavation mechanism is not fully understood, however it may be that at least one or more of the following mechanisms is a contributing factor:
1. Material vapourization of the absorbing component layer coating.
2. Differential expansion of portions of the absorbing component layer coating.
3. $H_2O$ in the pores of the absorbing component layer coating.

Of the coating materials previously mentioned, NaF, LiF, $MgF_2$, $SiO_2$, $ThF_4$, $LaF_3$, $NdF_3$, $GeF_3$, $GeO_2$, $ThO_2$, $Al_2O_3$, MgO, $PbF_2$, $GeO_2$, $Sb_2O_3$, $HfO_2$, $Bi_2O_3$, $La_2O_3$, $Sc_2O_3$, $Nd_2O_3$, $TaO_5$, SiN, $ZrO_2$, ZnS and $TiO_2$ are suitable for use as coatings which are relatively non-absorbing in the visible part of the spectrum, while Ag, Al, Au, Cu, Cr, Ge, Ni, NiCr, Si and Rh are suitable for use as coatings which are relatively absorbing in the visible spectral region.

We claim:
1. A method of manufacturing an optical interference authenticating device comprising:
   (a) depositing two coatings on a substrate, each of the said coatings comprising at least one optical interference layer, the materials of the layers being selected so that the two coatings together and separately have different, known spectral reflectance and spectral transmittance characteristics, at different angles of incidence of light thereon,
      (i) a first one of the said coatings being sufficiently radiation-absorbing for electromagnetic radiation of a particular wavelength to be excavatable by a beam thereof of sufficient intensity and duration,
      (ii) a second one of the said coatings being insufficiently radiation-absorbing for the said electromagnetic radiation of a particular wavelength to be substantially resistant to excavation solely by absorbing radiation of a beam thereof of sufficient intensity and duration to excavate the said first one of the coatings, and
   (b) excavating, by a beam of the said electromagnetic radiation, at least one identifiable configuration in the said first coating, to form at least one excavated area therein having a sufficiently different reflectance or transmittance than the remainder of the said first coating to be distinguishable therefrom at a particular angle of incidence of light on the substrate.

2. A method according to claim 1, wherein the said second coating is deposited on the substrate before the said first coating is deposited thereon, so that the said second coating remains substantially intact when the at least one portion of the said first coating is excavated by the said beam of electromagnetic energy.

3. A method according to claim 1, wherein the said first coating is deposited on the substrate before the said second coating is deposited thereon, so that the portions of both the said first and second coatings are excavated by the said beam of electromagnetic radiation.

4. A method according to claim 1, wherein the said first coating is substantially transparent for a known spectral region.

5. A method according to claim 1, wherein the said second coating is substantially transparent for a known spectral region.

6. A method according to claim 1, wherein the optical interference device is for attachment to a substantially non-transparent article, and the substrate is of a material that is substantially transparent for the spectral regions of the known characteristics of the first and second coatings so that the substrate may form a protective, outer covering for the first and second coatings when the optical interference authenticating device is attached to the non-transparent article.

7. A method according to claim 1, wherein at least one further coating comprises at least one further layer having different, known spectral reflectance characteristics and spectral transmittance characteristics to the remainder is deposited on the substrate.

8. A method according to claim 1, wherein the said electromagnetic energy is infrared laser radiation.

9. A method according to claim 1, wherein the substrate is a polyester film having a thickness no greater than of the order of 0.25 mils, and the infrared laser radiation has a wavelength at least of the order of 10.8 $\mu$m and is directed through the substrate to excavate the said at least one portion of the said first coating.

10. A method according to claim 9, wherein the sum of the optical thicknesses of the said two coatings, including any other coatings having known spectral reflectance and transmittance characteristics that may be deposited on the substrate, does not exceed 2.2 $\mu$m.

11. A method according to claim 10, wherein the thickness of any coating does not exceed 0.4 $\mu$m.

* * * * *